Feb. 25, 1964
T. E. COX
3,122,163
DAMPER POSITION-RETAINING DEVICE
Filed June 20, 1960
2 Sheets-Sheet 1
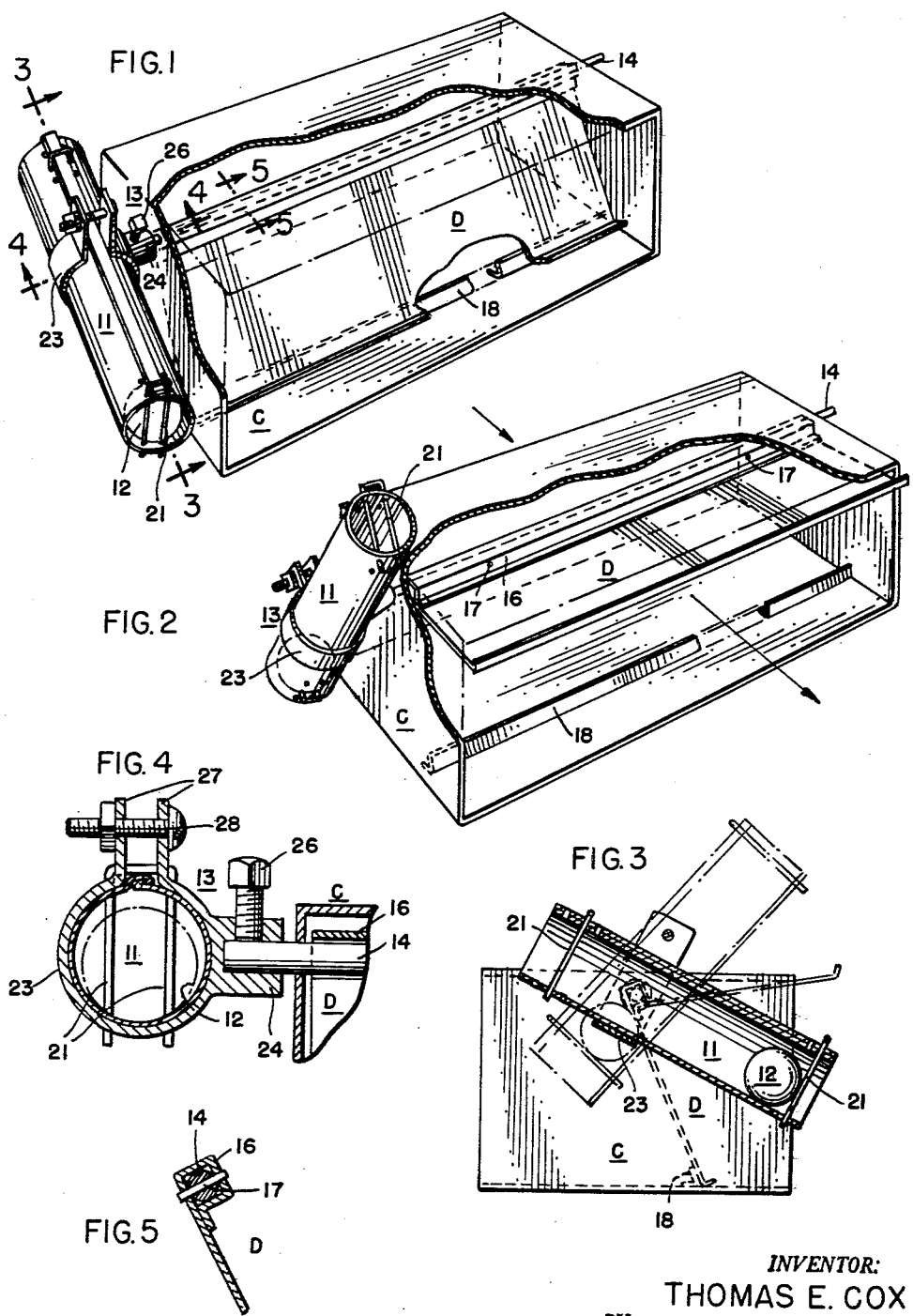
INVENTOR:
THOMAS E. COX
BY
ATT'YS Feb. 25, 1964 T. E. COX 3,122,163
DAMPER POSITION-RETAINING DEVICE
Filed June 20, 1960 2 Sheets-Sheet 2

INVENTOR:
THOMAS E. COX
BY
Rummler and Snow
ATT'YS

United States Patent Office 3,122,163
Patented Feb. 25, 1964

3,122,163
DAMPER POSITION-RETAINING DEVICE
Thomas E. Cox, 128 N. Mayfield Ave., Chicago 44, Ill.
Filed June 20, 1960, Ser. No. 37,149
5 Claims. (Cl. 137—527.8)

This invention relates to devices for firmly holding a conduit damper or shutter in its fully-open or fully-closed positions.

Air exhaust fans for residences, commercial and industrial buildings are located in an outside wall to blow air out through a conduit. The conduit is equipped with a damper or shutter which opens under the exhaust-air pressure, when the fan is operating, and which closes by gravity when the fan is idle. Unless some means is provided for holding the damper or shutter firm in the closed position, gusts of wind tend to flutter the damper or shutter. This not only creates an annoying noise but causes unnecessary heat loss and a material wear and tear on the damper or shutter. The use of springs, balanced weights, latches and other contrivances, to secure the damper or shutters against such fluttering, have not proven too generally acceptable, for various reasons incident to their structure or functioning.

The main objects of this invention are to provide an improved device for firmly holding air-pressure, gravity-actuated dampers or shutters in each of their extreme positions; to provide an improved device of this kind so structed and attached to the damper or shutter that a weight is shifted by the swinging of the damper or shutter to so counterbalance the damper or shutter as to firmly retain it in either shifted position, depending upon the operating conditions of the fan; and to provide a damper-positioning device of this kind of such simple construction as to make its manufacture very economical, its attachment to a damper or shutter easily effected, and its functioning absolutely positive.

In the accompanying drawings several embodiments are shown of a damper-positioning device constructed in accordance with this invention, wherein FIGURE 1 is a perspective view of the external end of an exhaust-air conduit to the damper of which one adaptation of this improved positioning device is attached to the damper shaft exteriorly of the conduit, the damper being shown in its closed position;

FIG. 2 is the same view showing the damper as retained in its open or retracted position;

FIG. 3 is a vertical, sectional view taken on the plane of the line 3—3 of FIG. 1 and showing in full and dotted outlines the damper and the positioning device in the respectively opposite positions;

FIG. 4 is an enlarged, fragmentary, cross-sectional detail taken on the plane of the line 4—4 of FIG. 1 and showing the manner of attaching the positioning device directly to the damper shaft;

FIG. 5 is an enlarged, fragmentary, cross-sectional detail showing how the damper is secured to its supporting shaft;

The essential concept of this invention involves an elongated element mounting a weight shiftable longitudinally thereof, the element being pivotally mounted on an exhaust-air conduit and so connected to the damper that the opposite shifting of the damper, by the forces of exhaust-air pressure and gravity, alters the angularity of the element with respect to the horizontal so as to shift the weight into position to supplement the respective damper-shifting forces and insure firm retention of the damper in each of its shifted positions.

A damper-positioning device, for mounting on an air-exhaust conduit C and attachment to its damper D, comprises a hollow cylinder element 11 mounting a weight 12 and having a connection 13 for attachment to the damper D.

The conduit C, as here shown, is that which usually is set in a building exterior wall to permit a suitably-mounted inside fan (not here shown) to exhaust air from the interior to the exterior of the building. The conduit here shown is of hollow prismatic form mounting the damper D inwardly from the open end of the conduit. Obviously, the conduit C could be cylindrical.

Figure 10:
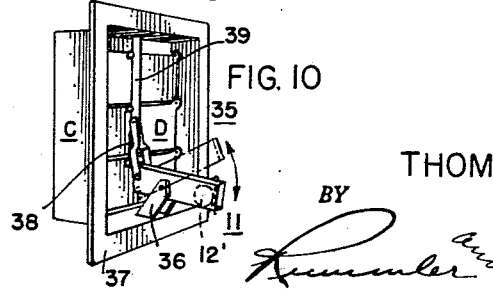
FIG. 10 is a miniaturized perspective of another adaptation of this type of damper-positioning device as mounted in an exhaust conduit having a multi-louvre shutter.

The damper D as herein shown, in all but FIG. 10, is a single piece of metal supported on a rod 14 extending across the conduit C interiorly adjacent the top wall of the conduit. Thus the damper D is permitted to swing upwardly and downwardly between its gravity-closed position and its exhaust-air pressure-open position. The vertical or longitudinal dimension of the damper here is shown as a bit greater than the depth of the conduit C. So that in its closed position, the damper D is disposed at an inclined angle.

In FIGS. 1–3 a perimetrical portion of the damper D is bent to form a rectangular hub 16 which embraces the rod 14 and to which the damper is keyed by one or more pins 17. (See FIGS. 2 and 5). In this adaptation the rod is journaled on the side walls of the conduit D and a stop strip 18 is fixed along the bottom of the conduit C.

Figure 6:
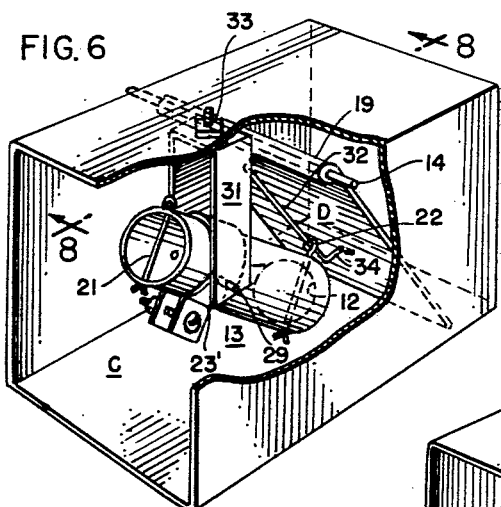
FIG. 6 is an adaptation of this improved damper-positioning device mounted within the air-exhaust conduit with a sliding connection to the damper, which is shown in its closed position.
Figure 7:
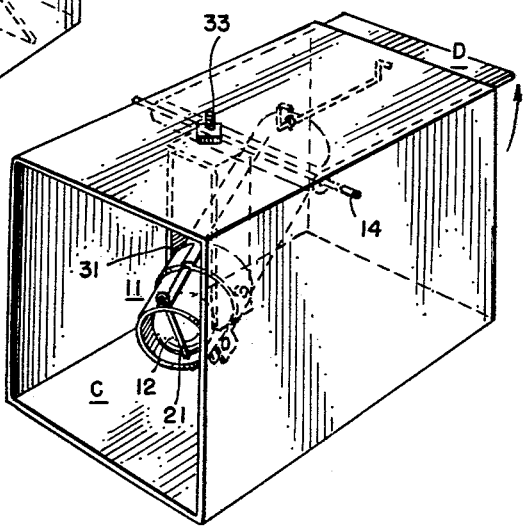
FIG. 7 is a similar view showing the damper shifted to its open position.
Figure 8:
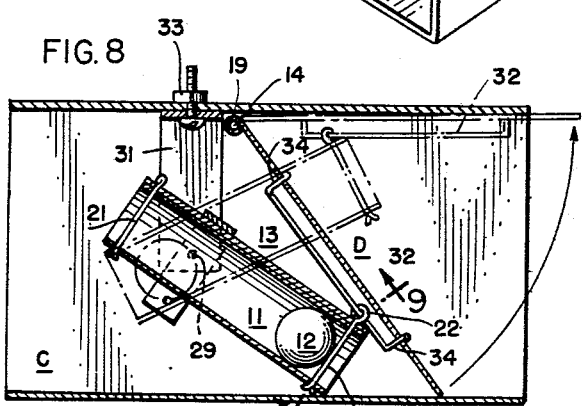
FIG. 8 is a longitudinal, sectional elevation as viewed from the plane of the line 8—8 of FIG. 6 and showing in full and dotted outlines the damper and the positioning device in the respectively opposite positions.
Figure 9:
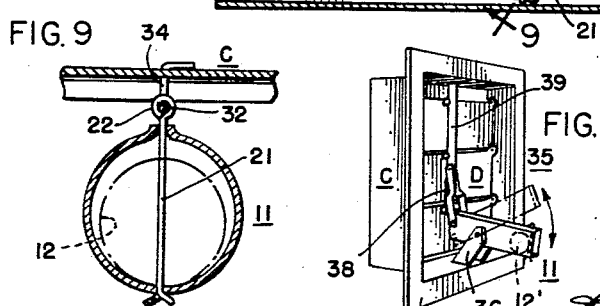
FIG. 9 is an enlarged, fragmentary, cross-sectional detail taken on the plane of the line 9—9 of FIG. 8.

In FIGS. 6–8 the perimetrical portion of the damper D is bent to form an annular hub 19 which embraces the rod 14 and whereon the damper is hinged.

The tubular element 11, in all but FIG. 10, is shown as a section of cylindrical tubing which may be either seamed or seamless.

Inwardly of its ends transverse stops 21 are arranged for confining the axial movement of the weight 12 within the element 11 as it is tilted back and forth. In FIGS. 1–4, these stops 21 are shown as pieces of wire bent U-shaped like staples which are of a length to extend across the element 11 when seated in suitable holes. In FIGS. 6–9, the stops 21 are shown as cotter pins the eyelet 22 of one of which forms a part of the damper connection 13, as will be explained presently.

The weight 12, in all but FIG. 10, is shown as a sphere, preferably a steel ball such as a large-size ball-bearing. Obviously, the diameter of the weight 12 is somewhat less than the inside diameter of the element 11 so as to roll freely from end to end between the stops 21 as the element 11 is tilted back and forth by the action of the damper through the connection 13.

The form of the connection 13 depends upon whether the weighted element 11 is located exteriorly or interiorly of the conduit C.

The connection 13 for the outside mounting of the element 11, comprises a sleeve 23 (or 23') embracing the element and integrated with a hub 24 mounting a set-screw 26 for keying the sleeve 23 to the rod 14 supporting the damper D.

The sleeve 23 here is shown as being a spring-metal band of slightly less than a complete circle with offset, spaced, parallel extensions spanned by a bolt-and-nut fastener 28 adapted for contracting the sleeve 23 to clamp in a desired position longitudinally on the element 11. Such an adjustable positioning of the sleeve 23 lengthwise of the element 11 makes it possible to vary the portions of the element disposed at opposite sides of the axis of the damper D, thereby altering the force of the weight 12 in opposite positions of the damper D.

The connection 13 for the inside mounting of the element 11 comprises a sleeve 23', a bracket 31 and a rod 32 embraced by the eyelet 22 of one of the cotter-pin stops 21.

The sleeve 23' is quite the same as the sleeve 23 except it mounts a pair of oppositely-disposed, radially-alined trunnions 29 in place of the hub 24. Like the sleeve 23, the sleeve 23' is adjustably positionable on the element 11 for the reason explained above. It should be obvious to those skilled in the art that any kind of a noise dampening material may be secured or otherwise affixed to the stop 21, such as sponge rubber, to minimize the noise caused by the weight 11 impinging against the stops 21.

The bracket 31 here is shown as a strip of metal bent to square U-shape and invertedly secured to the top wall of the conduit by a fastener 33. The end of the parallel parts of the bracket 31 are apertured to provide bearings for the trunnions 29 for swingably supporting the weighted element 11 in the same manner as when positioned exteriorly of the conduit C, as has been explained above.

The rod 31 is of a length somewhat greater than half the length of the damper D. The ends 34 are bent transversely to the main part and have their extremities suitably fixed to the damper D to dispose the main part of the rod 31 spaced from the damper substantially along the longitudinal median thereof. The rod 31 is slidingly embraced by the eyelet 22 on the one cotter pin stop 21.

The adaptation of FIG. 10 shows this kind of device positioned to be shifted by a conventional, framed, multilouvre shutter 35. The element 11 here is shown as a hollow prism wherein the weight 12' is in the form of a disk. The element 11 is hinged to a bracket 36 attached to the base of the louvre frame 37 with a link 38 connecting the inner end of the element 11 to a conventional louvre operating-bar 39.

The functioning of this damper-positioning device is believed to be quite obvious from the foregoing explanation. In any one of the illustrated adaptations, gravity normally forces the damper D to its closed position. Thereupon, the element 11 is swung to a position to shift the weight 12 to that end of the element 11 which is most remote from the axis of the element mounting. So effective will that weight 12 be, with the element 11 in such position, that the damper D will be so firmly pressed into its closed position that no exterior gust of wind can effect the damper to cause a fluttering thereof.

Once the fan is started, the exhaust-air pressure against the damper D will effect its elevation in he usual manner. Thereupon the element 11 will be swung to its opposite inclination causing the weight 12 to shift to the opposite, or short, end of the element. Thereupon, the oppositely-weighted element 11 will tend to firmly hold the damper D in its fully-open position so long as there is an effective exhaust-air pressure through the conduit C.

Although several embodiments of the invention are herein shown and described, it will be understood that numerous details of the construction shown may be altered or omitted without departing from the spirit of the invention as defined by the following claims:

I claim:
1. An exhaust-conduit damper-position-retaining device comprising,
   a. a conduit with an open end exposed to external wind pressures and subject to pressured air flow therethrough from the other end,
   b. a damper hinged in the conduit inwardly from the open end, biased by gravity to a closed position, and swingable to an open position by the pressured air flow through the conduit,
   c. An elongated hollow element hinged on the conduit by a sleeve clamp embracing the element intermediate the ends of the element and shiftable axially on the element to alter the location of the element to the hinge axis and connected to the damper to be actuated by the swinging thereof, as caused by the pressured air flow through the conduit, to dispose the element axis in opposite angular relationship with the horizontal, and
   d. a weight shiftable axially of the element between the opposite ends thereof to stabilize the damper in its, respectively, opposite positions against movement by fluctuations, respectively, in the air pressure through the conduit, or by external wind pressures.

2. An exhaust-conduit-damper-position-retaining device as set forth in claim 1 wherein said element is positioned exteriorly of the conduit.

3. An exhaust-conduit damper-positioning device comprising, a damper hinged in a conduit for opposite swinging by exhaust air pressure and gravity, an elongated hollow element, a weight freely shiftable within the element between the ends thereof, a bracket for swingably supporting the element within a conduit on an axis intermediate the element ends to permit opposite angular movement of the element across a horizontal plane through the axis of the element mounting, an eyelet fixed on one end of the element, and a rod embraced by the eyelet and attachable to the damper whereby the opposite shifting of the damper under the forces of exhaust-air pressure and gravity so alter the angularity of the element as to shift the weight to one end or the other of the element for holding the damper in its respectively opposite positions.

4. An air-exhaust conduit, a damper hinged in the conduit for opposite swinging by exhaust-air pressure and gravity, an elongated hollow element, a weight freely shiftable within the element between the ends thereof, a bracket swingably mounting the element within the conduit on an axis intermediate the element ends to permit opposite angular movement of the element across a horizontal plane through the axis of the element mounting, an eyelet fixed on one end of the element, and a rod slidingly embraced within the eyelet and connected to the inner face of the damper longitudinally thereof, whereby the opposite shifting of the damper under the forces of air-exhaust pressure and gravity so alter the angularity of the element as to shift the weight to one end or the other of the element for holding the damper in its respectively opposite positions.

5. An air-exhaust conduit, a damper hinged in the conduit for opposite swinging by exhaust-air pressure and gravity, an elongated hollow element, a weight freely shiftable within the element between the ends thereof, a bracket swingably mounting the element within the conduit on an axis intermediate the element ends to permit opposite angular movement of the element across a horizontal plane through the axis of the element mounting, an eyelet fixed on one end of the element, and a rod connected to the inner face of the damper and slidingly embraced by the eyelet whereby the opposite shifting of the damper under the forces of air-exhaust pressure and gravity so alter the angularity of the element as to shift the weight to one end or the other of element for holding the damper in its respectively opposite positions.

References Cited in the file of this patent

UNITED STATES PATENTS

| 217,431 | Tilton | July 8, 1879 |
| 1,031,514 | Bjorkstam | July 2, 1912 |
| 1,057,721 | Freeman | Apr. 1, 1913 |
| 2,394,994 | Gibb | Feb. 19, 1946 |